(12) United States Patent
Sanyal

(10) Patent No.: US 7,268,723 B2
(45) Date of Patent: Sep. 11, 2007

(54) SYSTEM AND METHOD FOR LOCATING TARGETS USING MEASUREMENTS FROM A SPACE BASED RADAR

(75) Inventor: Probal K. Sanyal, Syracuse, NY (US)

(73) Assignee: The MITRE Corporation, McLean, VA (US)

( * ) Notice: Subject to any disclaimer, the term of this patent is extended or adjusted under 35 U.S.C. 154(b) by 181 days.

(21) Appl. No.: 11/133,332

(22) Filed: May 20, 2005

(65) Prior Publication Data

US 2006/0262008 A1    Nov. 23, 2006

(51) Int. Cl.
*G01S 13/42*    (2006.01)
(52) U.S. Cl. .................. 342/120; 342/58; 342/108; 342/125; 342/126; 342/139; 342/145; 342/146
(58) Field of Classification Search .............. 342/58, 342/107, 108, 120, 125, 126, 139, 140, 145, 342/146, 147, 357.01, 357.06, 357.08, 357.13, 342/450–465
See application file for complete search history.

(56) References Cited

U.S. PATENT DOCUMENTS

| | | | | |
|---|---|---|---|---|
| 4,965,586 A | * | 10/1990 | O'Neill et al. | 342/357.17 |
| 5,463,553 A | * | 10/1995 | Araki et al. | 701/208 |
| 6,327,533 B1 | * | 12/2001 | Chou | 701/207 |
| 6,484,098 B1 | * | 11/2002 | Takemura | 701/213 |
| 6,826,478 B2 | * | 11/2004 | Riewe et al. | 701/220 |
| 2002/0169548 A1 | * | 11/2002 | Kuroda et al. | 701/212 |
| 2005/0004749 A1 | * | 1/2005 | Park | 701/200 |
| 2006/0262008 A1 | * | 11/2006 | Sanyal | 342/120 |

* cited by examiner

*Primary Examiner*—John B Sotomayor
(74) *Attorney, Agent, or Firm*—Sterne, Kessler, Goldstein & Fox, P.L.L.C.

(57) ABSTRACT

A system and method for determining a position of a target within an acceptable tolerance using an iterative approach. A airborne or space-based measuring device is used to measure an estimated position of the target. The information from the measuring device is used in conjunction with either live captured or stored topography, or the like, information relating to the surface of the planet proximate the target to iteratively determine the actual position of the target.

17 Claims, 13 Drawing Sheets

SYSTEM AND METHOD FOR LOCATING TARGETS USING MEASUREMENTS FROM A SPACE BASED RADAR

STATEMENT REGARDING FEDERALLY SPONSORED RESEARCH AND DEVELOPMENT

Statement under MPEP 310. The U.S. government has a paid-up license in this invention and the right in limited circumstances to require the patent owner to license others on reasonable terms as provided for by the terms of Contract No. FA8721-04-C-0001, awarded by DARPA.

BACKGROUND

1. Field of the Invention

The present invention relates to determining positions of targets using airborne measuring systems.

2. Background Art

Currently, measuring systems for measuring target positions from airborne measuring devices require the measuring device and target to be in planes parallel to each other and parallel to a ground plane of the target planet. If these two criteria are not met, the measurement accuracy is substantially reduced. Recently, there has been a need to measure targets that are on in planes that are not parallel to a ground plane of the planet (e.g., vehicles moving through mountains). Also, recently more satellite or spaced-based measuring devices have become available for use to measure targets on planets. Theses spaced-based devices may constantly move, and are typically not perfectly parallel with either the target and/or the ground plane of the planet.

Therefore, what is needed is a system and method that would allow for accurate measuring of a target position regardless of the orientation of the target or a measuring device used to measure the target position.

SUMMARY

An embodiment of the present invention provides a system comprising a target, a surface determining device, an airborne measuring device, and a processing device. The target lies outside a ground plane of a planet. The surface determining device determines a topographical map of the actual surface of the planet proximate the target. The airborne measuring device transmits a signal toward the target and receives a return signal from the target based on the transmitted signal. The processing device, which is coupled to the airborne measuring device, determines a position of the target based on the received signal.

Another embodiment of the present invention provides a method for determining the position of a target. The method includes determining an estimated target position value in a first coordinate system for the target. The estimated target position value is then converted into a second coordinate system of an airborne measuring device. A topographical map of a surface of the planet proximate the target is determined and an actual target position value is iteratively calculated based on the converted estimated target position value and the topographical map.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate one or more embodiments of the present invention and, together with the description, further serve to explain the principles of the invention and to enable a person skilled in the pertinent art to make and use the invention.

Figure 4:
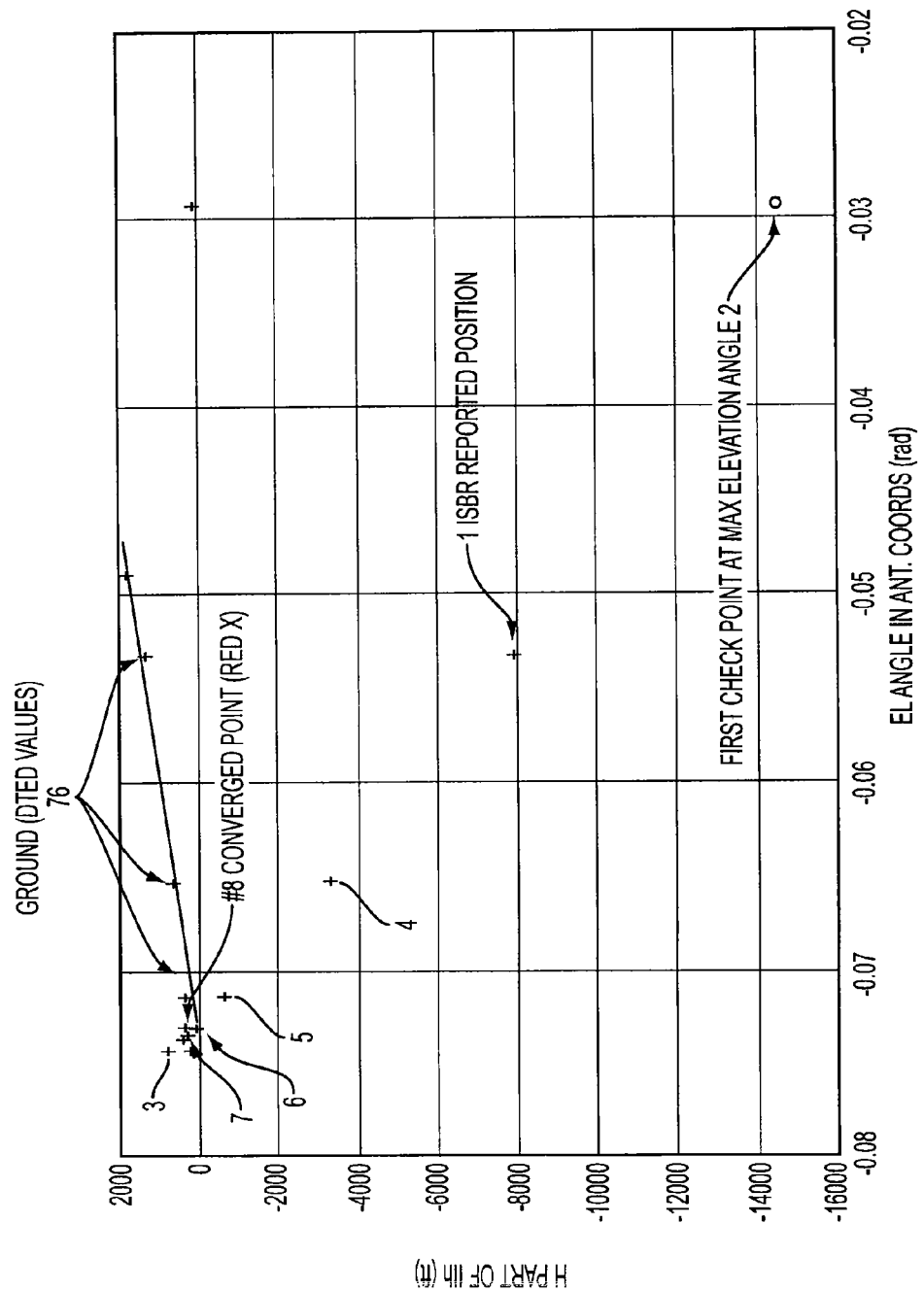

FIG. 4 graphically shows iterations of a "swing the range vector" algorithm, according to an embodiment of the present invention.

Figure 5:
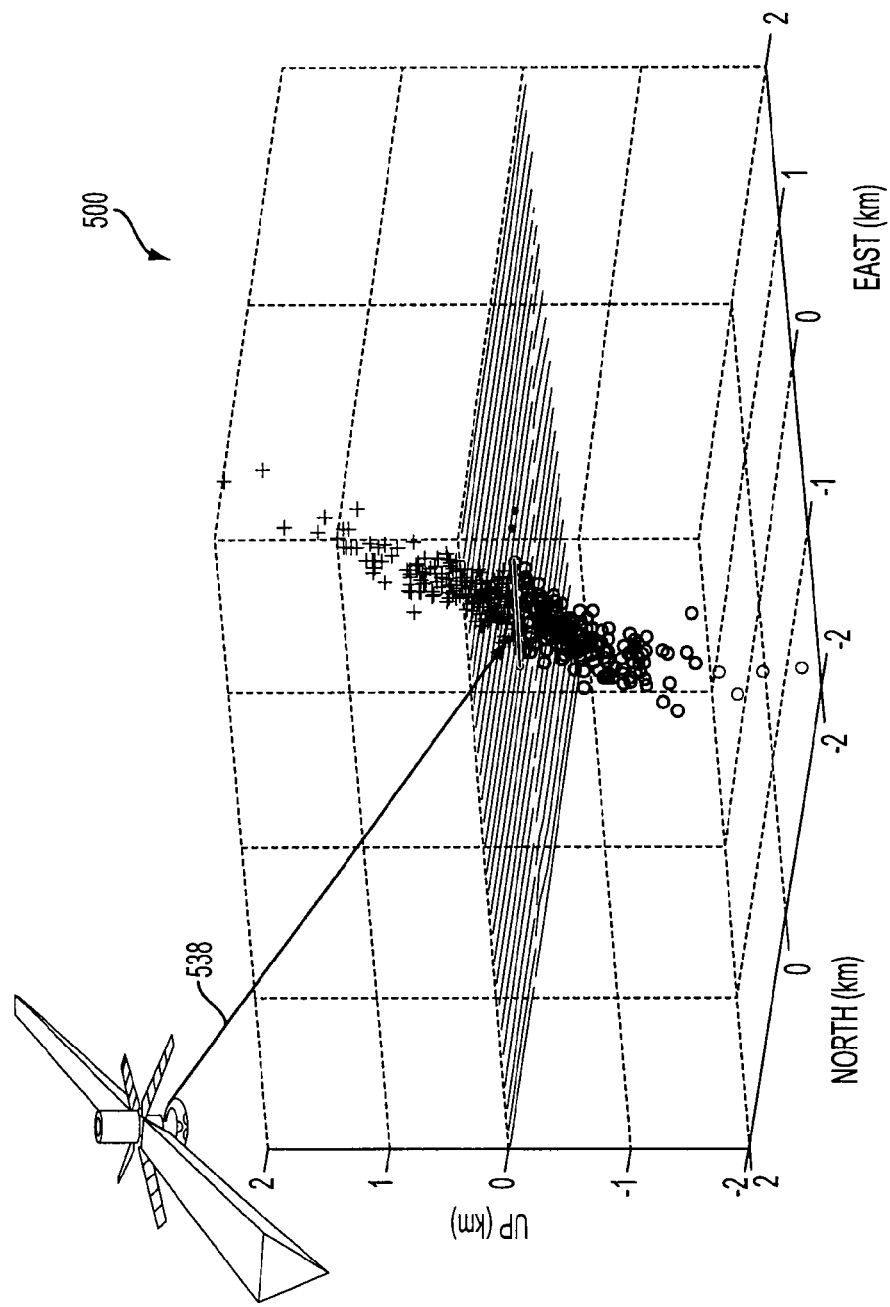

FIG. 5 graphically shows converged points of the iterations of the "swing the range vector" algorithm, according to an embodiment of the present invention.

Figure 6:
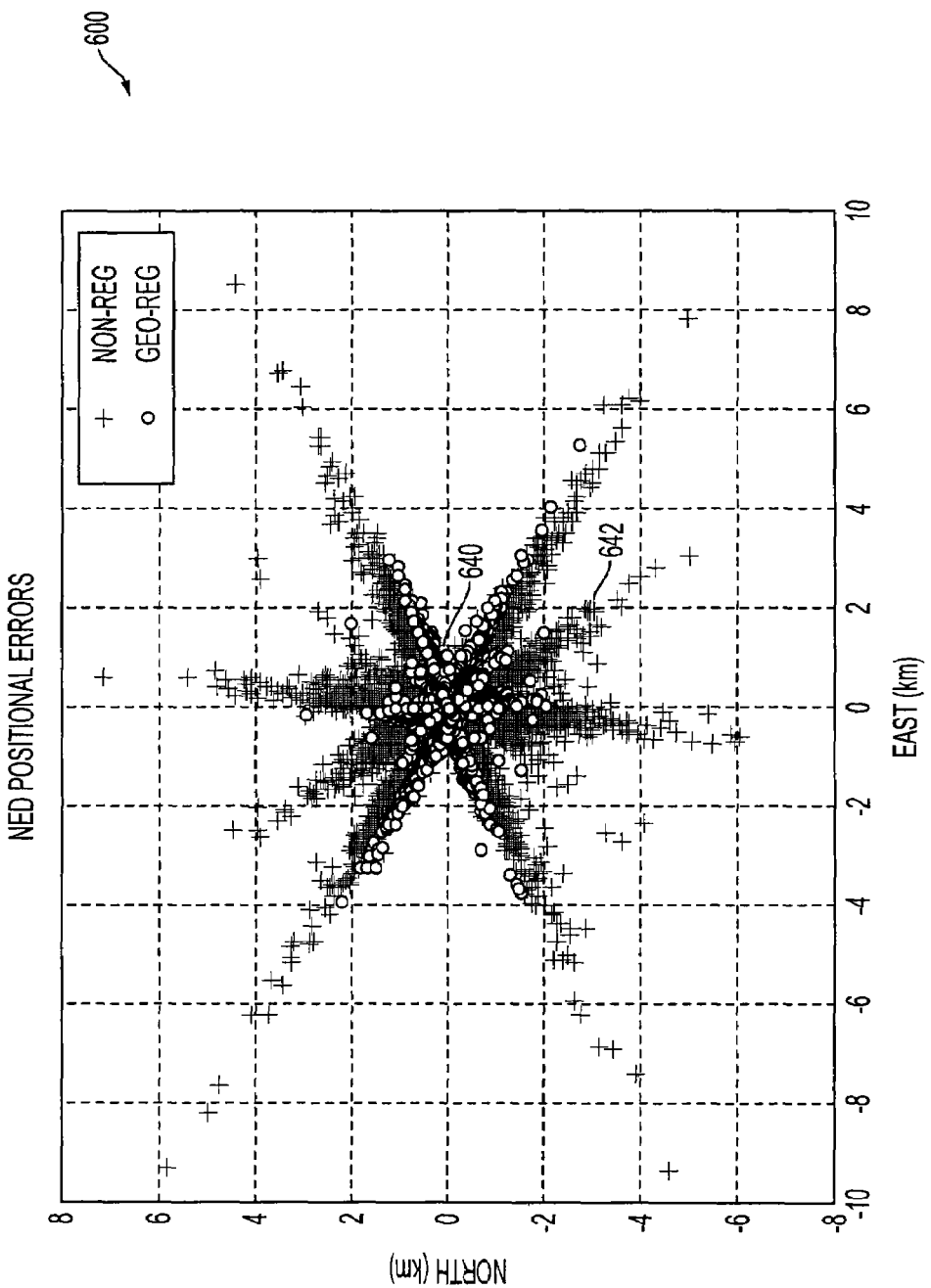

FIG. 6 graphically shows the position error difference between a georegistration algorithm of the present invention and a conventional algorithm.

Figure 7:
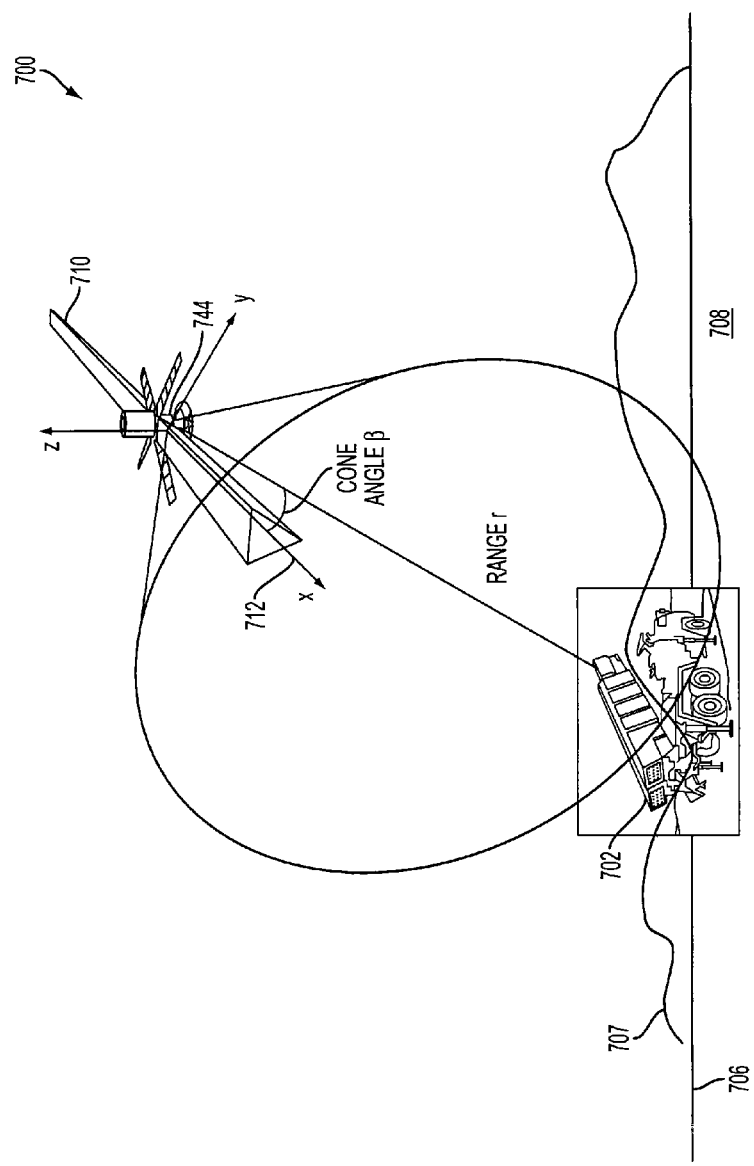

FIG. 7. shows a system for locating ground targets with space-based radars, according to another embodiment of the present invention.

Figure 8:
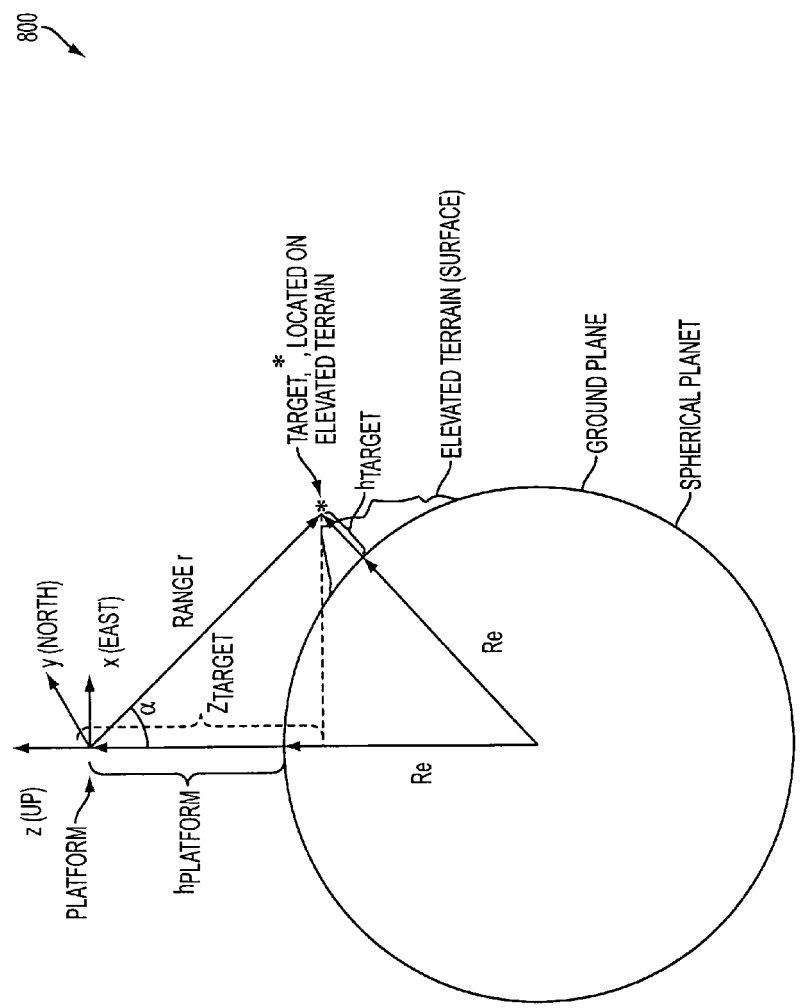

FIG. 8 shows a system for computing a z component of a target position in a platform-based ENU (east-north-up) system, according to an embodiment of the present invention.

Figure 9:
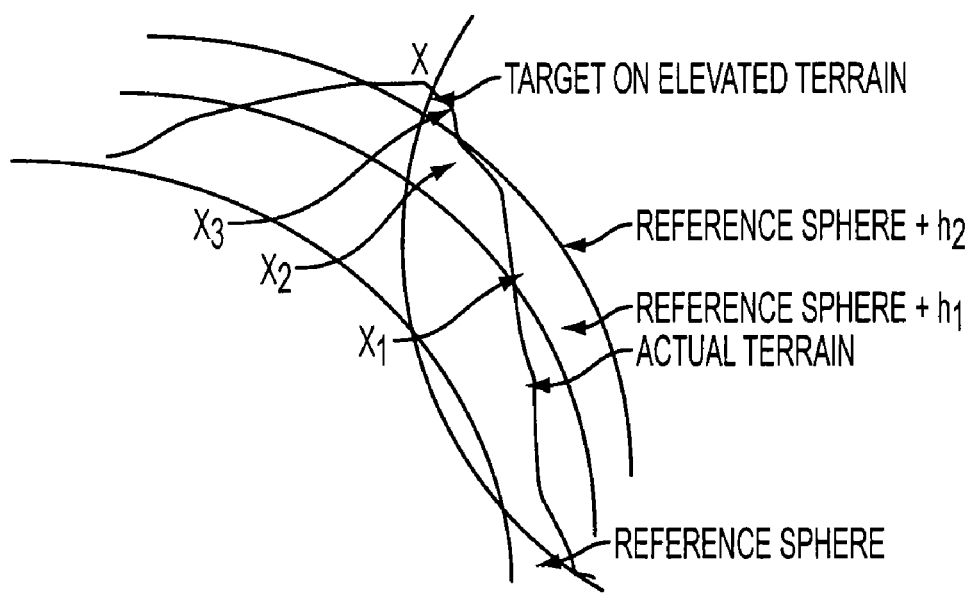

FIG. 9 graphically shows an iterative scheme for incorporating the target elevation in the target location process, according to an embodiment of the present invention.

Figure 10:
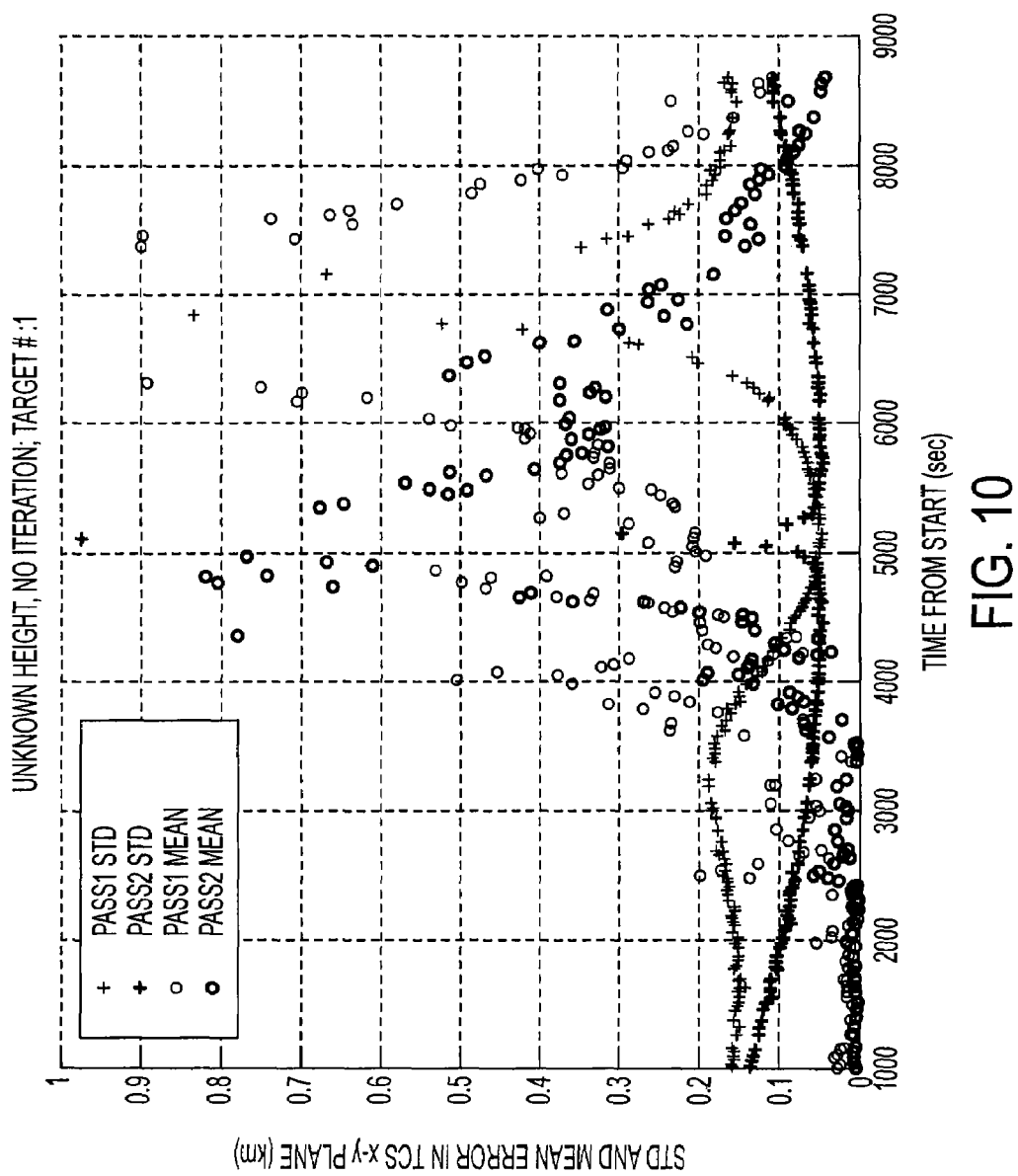

FIG. 10 shows the standard deviation of the position errors on the ground plane from 1000 Monte Carlo runs for a single target when no DTED information is available.

Figure 11:
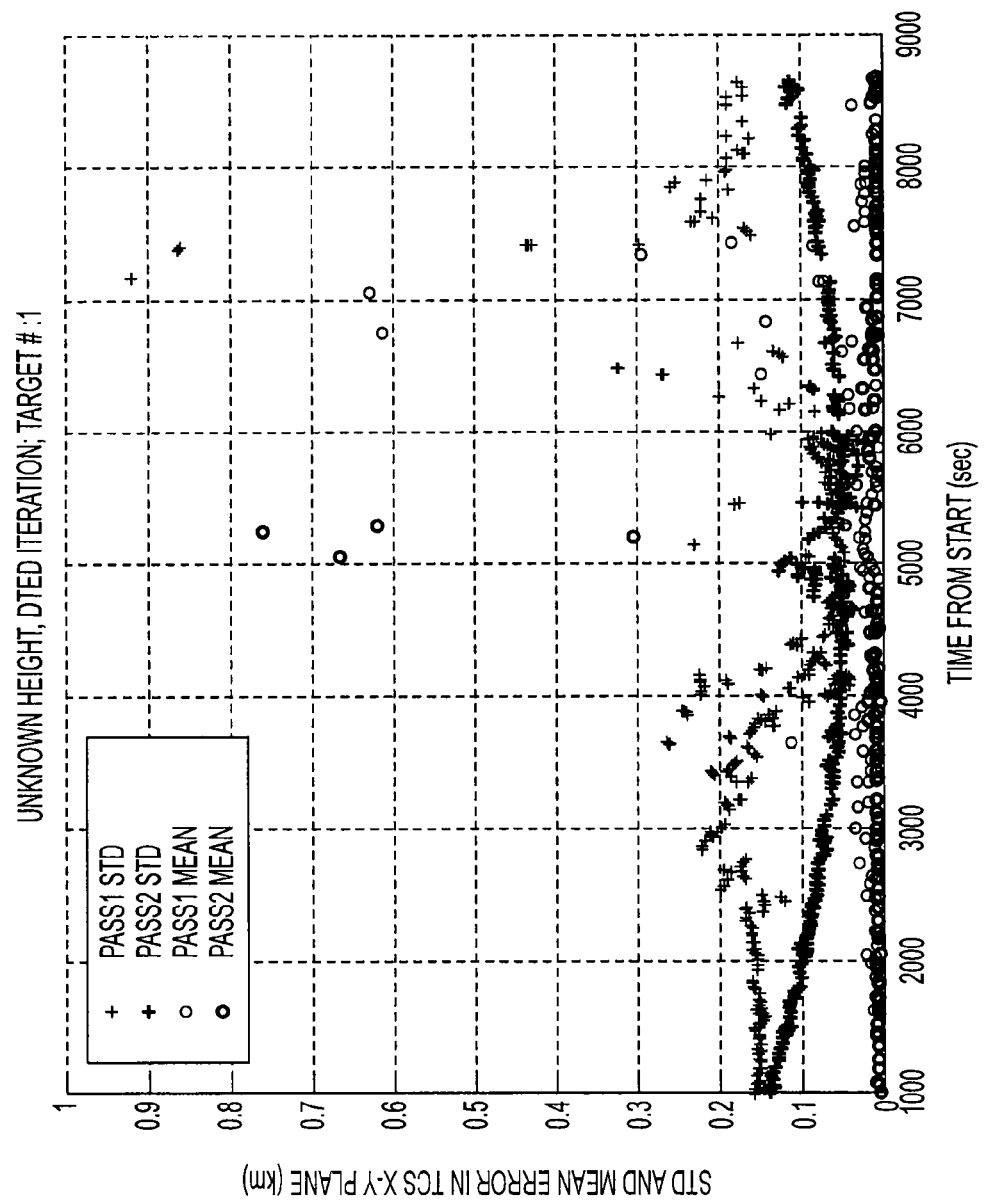

FIG. 11 shows the standard deviation of the position errors on the ground plane from 1000 Monte Carlo runs for a single target when DTED information is available.

Figure 12:
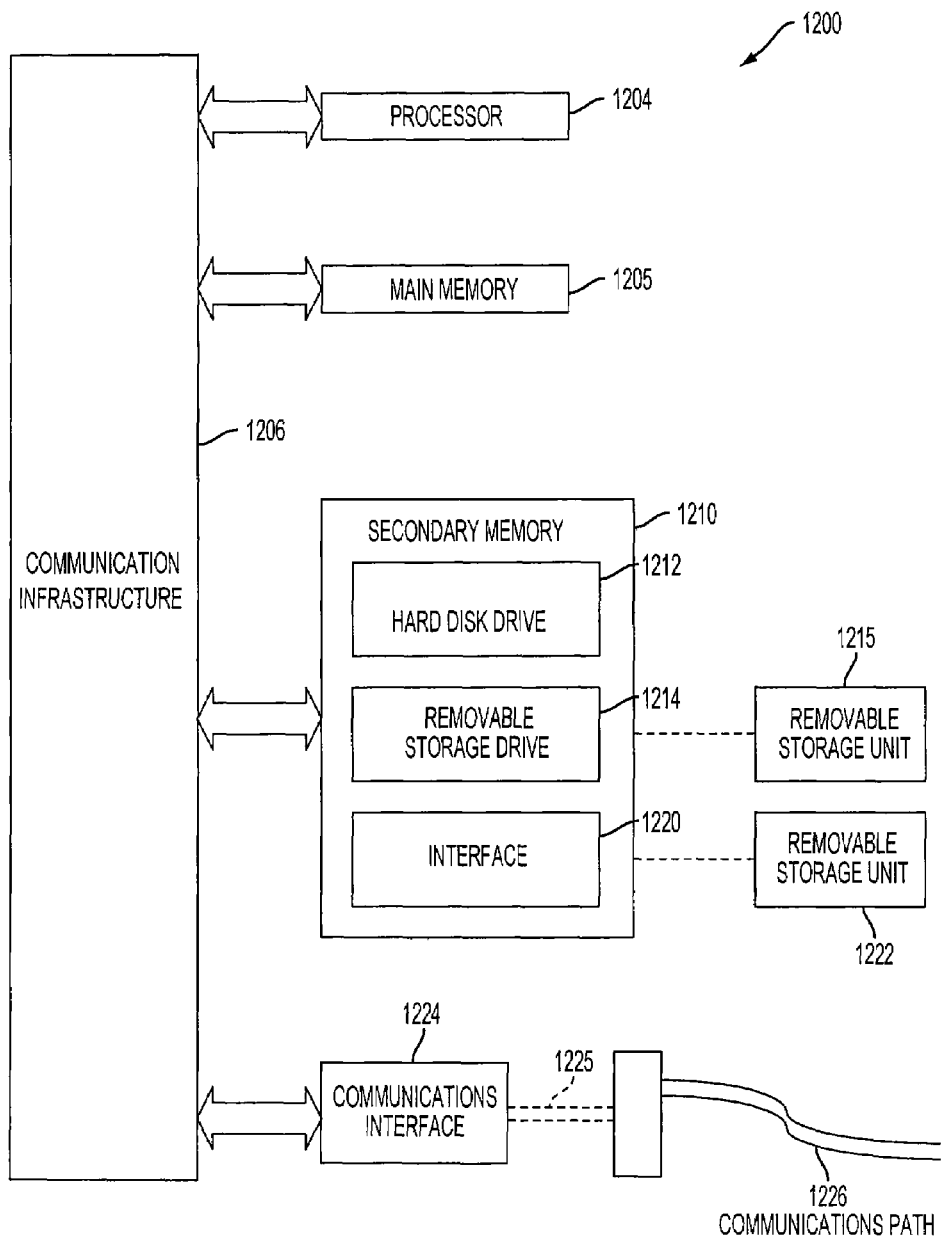

FIG. 12 illustrates an example computer system, in which the present invention can be implemented as computer-readable code.

Figure 13:
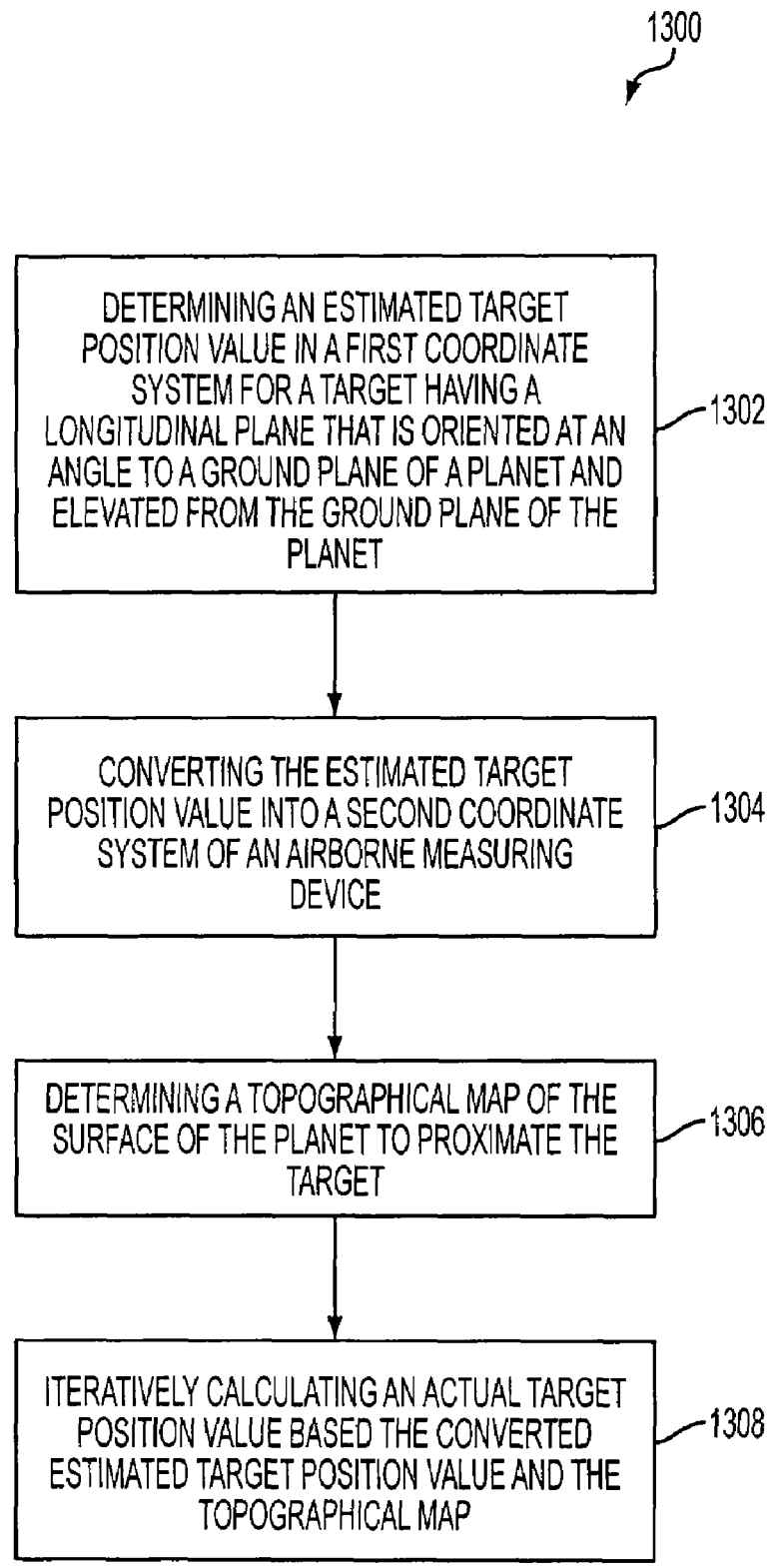

FIG. 13 is a flowchart depicting a process, according to an embodiment of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Overall System

Figure 1:
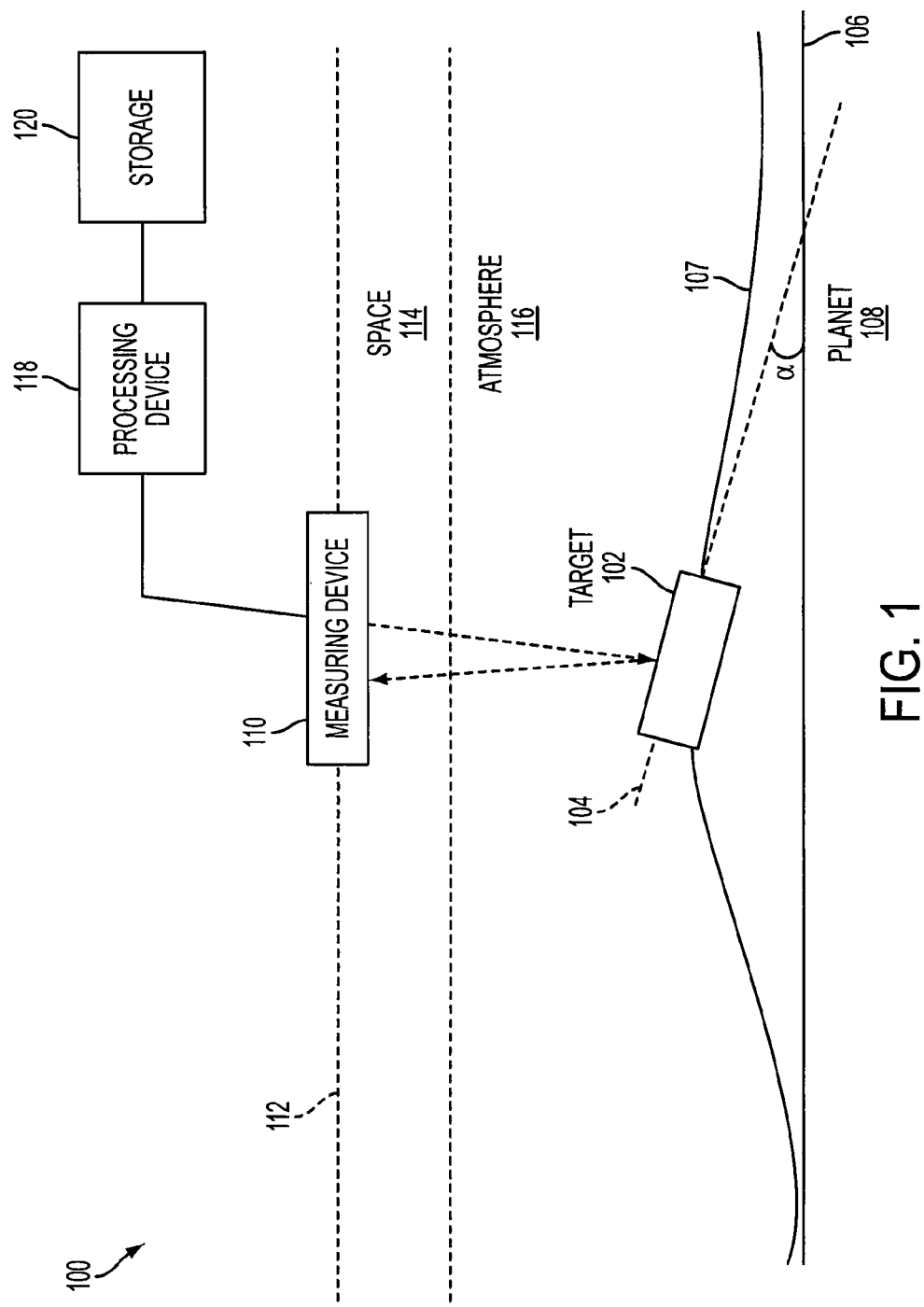
FIG. 1 shows a system for locating ground targets with space-based radars, according to an embodiment of the present invention.

FIG. 1 shows a system 100, according to an embodiment of the present invention. System 100 includes a target 102 having a longitudinal axis 104 that is angled at an angle α with respect to a ground plane 106 of a planet 108. Target 102 is positioned on a surface 107 of planet 108. For example, a ground plane can be based on a plane tangential to a point on surface 107 that is of interest. System 100 also includes an airborne measuring device 110 having a airborne measuring device longitudinal axis 112. In one example, measuring device 110 is positioned in space 114, while in another example measuring device 110 is positioned in an atmosphere 116 of planet 108. Coupled to measuring device 110 is a processing device 118, which in one example can be within measuring device 110 or in other examples remote from measuring device 110. Coupled to the processing device is a storage device 120, which could also be within the measuring device or remote from it.

As discussed in more detail below, measuring device 110 can be a spaced-based measuring device, such as a radar or an antenna, or the like, and can be used to determine a position of target 102 that is not located on ground plane 106, i.e., target 102 is located on surface 107 that is elevated and possibly at an angled location above ground plane 106, e.g., a side of mountain in which its orientation is angled with respect to the ground plane 106. In order to determine the position of target 102, iterative calculations are performed by processing device 118 based on measurements made by measuring device 110 and information either captured in real-time or previously-stored in storage device 120. The information can be, but is not limited to, topographical maps of surface 107 of planet 108 proximate an estimated position of target 102. In this way, a measuring device and target that are not positioned on a ground plane of a planet can still calculate a positioned of the target within a desired tolerance.

First Exemplary Process for Locating Ground Plane Targets

Figure 2:
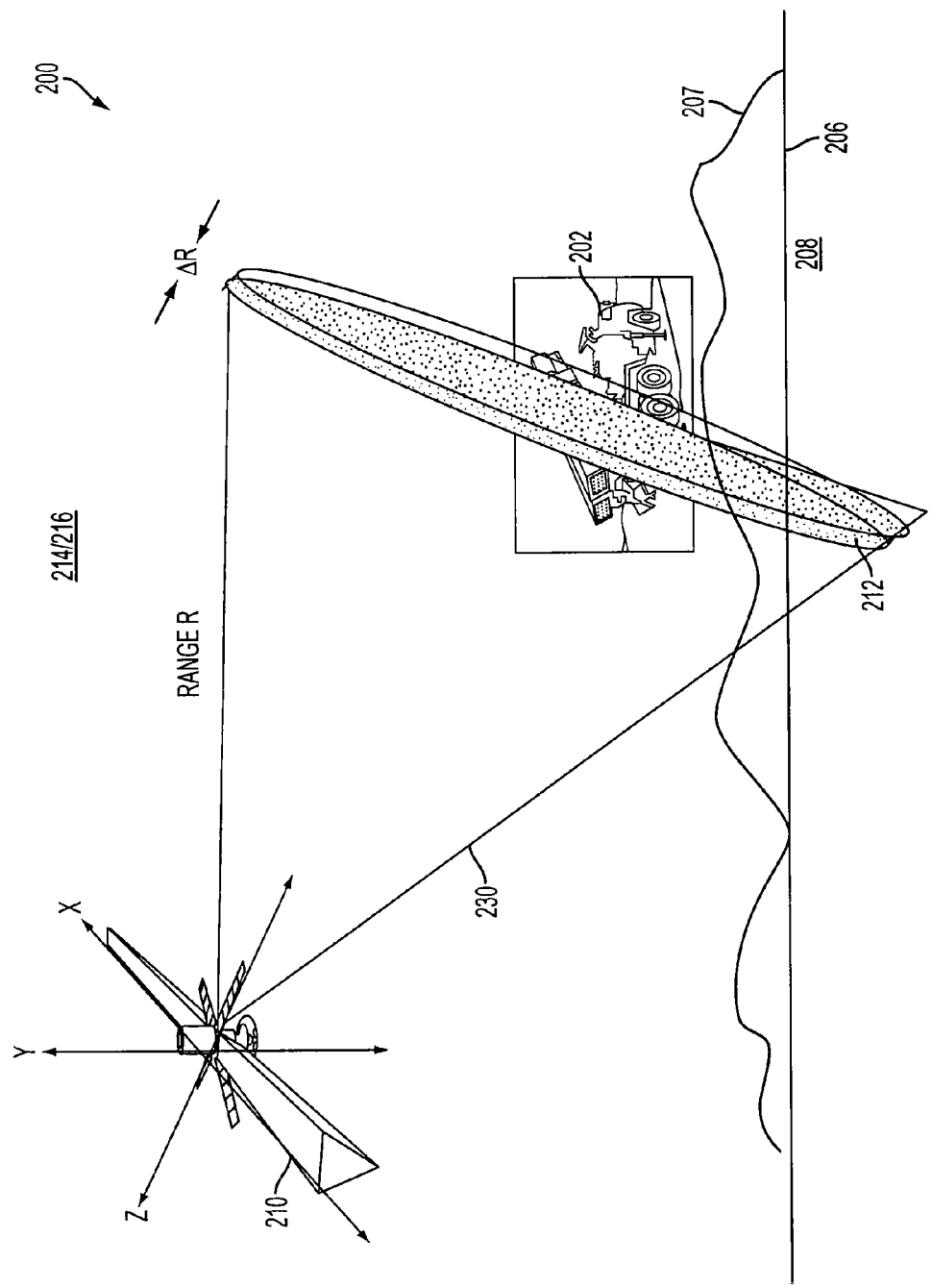
FIG. 2 shows a system for locating ground targets with space-based radars, according to another embodiment of the present invention.

FIG. 2 shows a system 200 for locating a target 202 with a measuring device 210 (e.g., a radar, an antenna, a radar antenna, or the like) in space 214 or atmosphere 216, according to an embodiment of the present invention. Target 202 is on a surface 207 of a planet 208. In system 200, a resolution cell 212 in measuring device 210 is not necessarily vertical to a ground plane 206 of planet 208. In the example shown, the space-based radar antenna 210, specifically an Innovative SBR (Space-Based Radar) Antenna Technology antenna (DARPA ACTD) (ISAT antenna), is a long, thin antenna that produces a thin fan beam 230. It will report a range R and two angles, azimuth and elevation. In one example, R can be, but is not limited to, 1,000 to 15,000 km. These three measurements define a unique point in 3D space, and its coordinates can be expressed in any desired coordinate system via the appropriate transformations. In particular, this point (or target position) can be expressed in a suitably chosen topo-centric coordinate system, as shown in FIG. 2. The reported position is not necessarily "on the ground." For example, the target position can be reported by the device 210, in a latitude-longitude-height system and satellite (also referred to as 'platform') position can be reported in an ECF (Earth Centered, Fixed, with standard definition) coordinate system.

The orientation of radar antenna 210, specifically, the orientation of the coordinate system is with respect to a bottom surface of antenna 210. The right-handed coordinate system, with its origin at a center point of antenna 210, is as follows (see FIG. 2):

a. x axis is along the long dimension of the antenna
b. z axis is normal to the face, in the direction of radiation
c. y axis completes the right handed system and is along the short dimension of the antenna In one example, the orientation of a face of antenna 210 is given in terms of roll (about the x axis), pitch (about the y axis) and yaw (about the z axis) angles with respect to the ENU (east, north, up) system with its origin at the platform center of mass. The sequence of the rotations is important. In one example, planar antenna 210 is flown in a nadir-pointing mode. This implies that the antenna x-y plane is the same as the ENU x-y plane. In another example, antenna 210 is yawed such that its long dimension is along the satellite velocity vector. For the discussion below, it is assumed that yaw is the first step in antenna rotation. In yet another example, antenna 210 is rolled about the x axis. Therefore, for the discussion below, it is assumed roll to be the next step in the rotation process. In yet a further example, there can be a rotation in pitch too, but it is rare.

Given the yaw, roll and pitch angles, an antenna rotation matrix can be derived whose elements are functions of the sines and cosines of these angles.

Once the antenna rotation matrix is computed, a conversion can be made for a vector expressed in the satellite ENU system to a vector in the antenna face coordinate system simply by pre-multiplying it by the rotation matrix, e.g., $$R\_in\_ant\_coords = ant\_rot\_mat * R\_in\_plat\_enu$$

where $R\_in\_plat\_enu$ = satellite-to-target range vector, expressed in the satellite ENU system
$R\_in\_ant\_coords$ = satellite-to-target range vector, expressed in the antenna face coordinate system and $ant\_rot\_mat$ = The antenna rotation matrix.

In an embodiment, storage 120 in FIG. 1 contains a Digital Terrain Elevation Data (DTED) database for the area of interest of a surface. This data is available from various government agencies, e.g., National Geospatial Intelligence Agency. In another embodiment, processing device 118 determines target positions on a planet.

A process to determine a location/position of a target on a surface 207, e.g., a mountain or other non-planar area of a planet 208, in an embodiment of the invention is now discussed. A determination is made if a target position with respect to a surface is approximately already known, i.e., a reported height of target (also referred to as altitude). The approximate height of the target with respect to ground plane 206 is then checked against the DTED database to see if the target altitude is equal or close enough to the DTED height for the same latitude-longitude pair in the DTED database. If not, further iterations are necessary. A more detailed discussion of this process for this example follows.

A first step in locating targets with space-based radars is to express the reported target position in the latitude-longitude-height format and compare the reported height with the DTED height.

Figure 3:
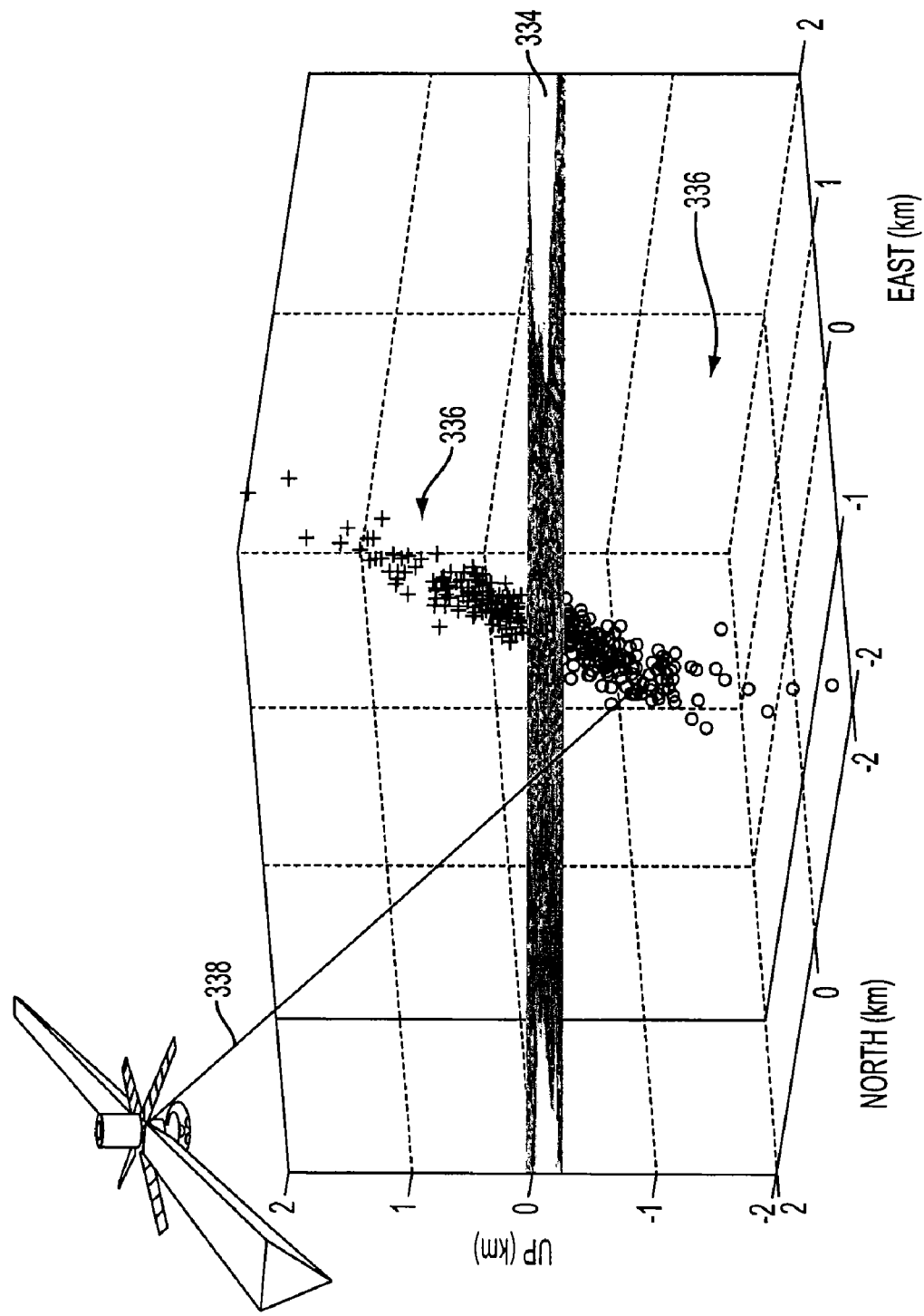
FIG. 3 shows a graph displaying positions of targets observed using the system of FIG. 2, according to an embodiment of the present invention.

FIG. 3 shows a graph 300 displaying positions of targets observed using system 200, according to an embodiment of the present invention. FIG. 3 shows reported positions of over 100 targets observed from a space radar (data from an AFRL simulation). The positions are displayed in an ENU system with its origin at the center of the area of interest. A first set of positions 332 are reported positions that appear to be above a ground plane level 334 and a second set of data 336 are reported positions that appear to be below ground plane level 334. A range vector 338 to one arbitrarily selected target position is shown. This target position appears, incorrectly, to be below the ground plane level 334.

A second step in locating targets is to express reported target positions in the antenna face coordinate system. The conversion from latitude-longitude height format to the antenna face coordinate format is performed using a series of coordinate conversion routines available from the AFRL (Air Force Research Lab) at Rome, N.Y. For example, the conversion can be performed using the following MATLAB codes.

```
% transform the target position to ECF coordinates (meters)
tgt_ecf = llh2ecf(tgt_llh);
% transform the satellite position to LLH (degrees, degrees, feet)
plat_llh = ecf2llh(sensor_platform_position);
% rotate platform and target to TCS frame w/ origin at platform
origin.lat = plat_llh(1)*pi/180;
origin.lon = plat_llh(2)*pi/180;
origin.hgt = plat_llh(3);
plat_tcs = ecf2tcs(sensor_platform_position);
tgt_tcs = ecf2tcs(tgt_ecf);
% compute the platform-to-target range vector, range, & bearing
R_in_plat_enu = (tgt_tcs - plat_tcs)';
And finally,
R_in_ant_coords = (ant_rot_mat * R_in_plat_enu)';
```

In the above, the various conversion routines are written as abc2xyz with abc and xyz representing the domains involved. Also, the term TCS (Topo-centric Coordinate System) is used interchangeably with ENU.

Having computed the target range vector in the antenna face coordinate system, a target azimuth and the elevation in this system is then computed as follows:

```
az_in_ant_coord = atan2( R_in_ant_coords(:,3),
    R_in_ant_coords(:,1) ); and
el_in_ant_coord = asin( R_in_ant_coords(:,2) / slant_range ).
```

A third step in locating targets is to check to determine which portion of the resolution cell is calculated to be above ground plane level and which portion of the resolution cell is calculated to be below ground plane level. This determination is made by iterations. During the iterations, the slant range (magnitude) and the azimuth angle of the target position are held at their measured values, respectively, since these are supposedly very accurately measured. However, since the elevation angle is supposedly poorly measured, this angle is allowed to vary until the tip of the range vector comes within a desirable tolerance to the ground per the DTED database.

For example, consider the case of a reported target position that is below the ground plane level. The elevation angle needs to be continuously adjusted to move the point 'up' to reach the ground plane level. However, since the orientation of the antenna in space is not obvious, initially it is not known whether this requires increasing or decreasing the elevation angle. Since the reported target position is within half an elevation beamwidth (assuming that all detections are within the 3-dB beamwidth) of the actual target position on the ground plane level, it is guaranteed that the ground plane level is within half an elevation beamwidth of the reported target position.

FIG. 4 graphically shows iterations of a "swing the range vector" algorithm, according to an embodiment of the present invention. Since it is guaranteed that one end of the resolution cell will be in the planet while the other end is above the ground plane, one first goes to the one extreme of the elevation beam (reported elevation angle plus half the elevation beamwidth, labeled 2 in FIG. 4) to check if it is on the same side of the ground plane level as the reported target position. In FIG. 4, the reported target position 1 and point 2 are on the same side of a ground plane (labeled near the top of the graph), which in the graph are shown be "below the ground." This establishes that the final solution has to be between point 1 and the other extreme of the beam (shown as point 3), which is guaranteed to be on the other side of i.e., above, the ground surface level.

A fourth step in locating targets is to iterate in elevation in the antenna face coordinate system until ground is reached. In FIG. 4, a first iterative trial point 4 is computed to be halfway in elevation between point 1 and point 3. The MATLAB code is as follows:

```
if nIterations(j) == 1
    next_el_in_ant_coord = elv_max; % el_in_ant_coord(j);
else
    ext_el_in_ant_coord = (elv_min + elv_max)/2.0;
end.
```

Having computed the next elevation angle, the new target range vector in the antenna coordinate system is then computed as follows:

```
next_cos_el = cos(next_el_in_ant_coord);
next_sin_el = sin(next_el_in_ant_coord);
next_R_in_ant_coords(1) = slant_range(j) * next_cos_el * cos_az(j);
next_R_in_ant_coords(2) = slant_range(j) * next_sin_el;
next_R_in_ant_coords(3) = slant_range(j) * next_cos_el * sin_az(j).
```

This vector is then expressed in the lat-long-height format via a series of transformations:

```
next_R_in_plat_enu  = (ant_rot_mat' * next_R_in_ant_coords')' ;
next_est_llh        = tcs2llh(next_R_in_plat_enu).
```

The DTED database is then searched, with interpolation if necessary, to obtain the terrain (surface) height at this computed target latitude-longitude pair. In FIG. 4, it is seen that point 3 happens to be above ground surface, i.e., on the opposite side of point 1. The trial point 4 is then halfway in elevation between point 1 and point 3, and we repeat the sub steps in this step.

A fifth step in locating targets is to perform convergence. Thus, the iteration continues until:

```
    abs(elv_wgs84 - est_llh(3)) < tol_h_feet
where
    elv_wgs84 = the corresponding height in the database.
```

The tolerance is set to any desired value, e.g., 10 meters. For the example shown in FIG. 4, the iterations produce points 5, 6 and 7. Finally, point 8 of the iteration is within a desirable tolerance to the ground plane level and hence the method produces the converged geo-located solution corresponding to the reported position.

FIG. 5 graphically shows in graph 500 converged points of the iterations of the "swing the range vector" algorithm discussed above. As compared to graph 300 in FIG. 3, graph 500 in FIG. 5 shows that the range vector 538 from the satellite is pointing to a position at ground plane level in which to measure the position of the target.

FIG. 6 graphically shows position error difference between points 640 obtained using a "swing the range vector" algorithm described above and points 642 obtained from a conventionally used algorithm. For reference, the center of this graph 600 is the actual position of the target. Thus, the graph shows that point 640 are generally closer to the center of the graph than points 642, and thus the algorithm of the present invention is more accurate than the conventional algorithm. An ISBR facility in the SPEAR Lab at the AFRL Rome Research Site, Rome, N.Y. was used to simulate a LEO constellation attempting to locate moving targets within an area of interest (AOI) in North Korea.

Second Exemplary System and Process for Locating Targets

FIG. 7. shows a system 700, according to an embodiment of the present invention. System 700 includes a target 702 on a surface 707 of a planet 708, which is above and angled with respect to a ground plane 706 of planet 708, and a measuring device 710, which can be an airborne or space-based measuring device (e.g., antenna, radar, etc.), as is discussed in detail above. Measuring device 710 measures two quantities: 1) a range R shown by a vector 714 measured from a center 744 of device 710 to a center of target 702; and 2) a cone angle β made by the range vector 714 with a longitudinal axis 712 of device 710. The position of this longitudinal axis in the platform-centered ENU (east-north-up) system is also available.

With the assumption that the target to be located is a surface target, the tip of the range vector lies on the ground plane 706 of planet 708, which is assumed to be spherical. The process of determining an accurate position of target 702 according to this embodiment is described in detail below.

FIG. 8 shows a system 800 for computing a z component of a target position in a platform-based ENU (east-north-up) system, according to an embodiment of the present invention. FIG. 9 graphically shows an iterative scheme for incorporating the target elevation in the target location process, according to an embodiment of the present invention.

FIG. 8 shows the relationship of the z component of the target's position in the platform ENU to the range, r, and the angle α, which is the compliment of the depression angle. This is not a measured quantity, rather, it is introduced only as an intermediate step in the derivations.

From FIG. 8, $$z = -r^* \cos(\alpha) \quad (1)$$

Assuming a spherical planet model and using the law of cosine for triangles, $$(R_e + h_{target})^2 = r^2 + (R_e + h_{platform})^2 - 2^* r^* (R_e + h_{target})^* \cos(\alpha) \quad (2)$$

where $R_e$ is the radius of the planet.

From (1) and (2), $$z = ((R_e + h_{target})^2 - r^2 - (R_e + h_{platform})^2)/(2^*(R_e + h_{target})) \quad (3)$$

Initially, the target altitude, $h_{target}$, is not known. The iterative technique described here solves the problem. The projection of the range vector, $\bar{r}$, on the antenna (i.e., platform) longitudinal axis, Ix, in terms of the measured range, r, and the measured cone angle, β, is:

$$r^* \cos(\beta) \quad (4)$$

The target xyz triplet defines the range vector, $\bar{r}$ in the platform-centered ENU system, i.e., $$\bar{r} = \begin{bmatrix} x \\ y \\ z \end{bmatrix} \quad (5)$$

Let the unit vector, $\bar{Ix}$, along the antenna longitudinal axis in the platform-centered ENU system, be given by the measured quantities (Ixx, Ixy, Ixz). Then, $$r^* \cos(\beta) = \bar{r} \cdot \bar{Ix} = (x^* Ixx + y^* Ixy + z^* Ixz) \quad (6)$$

or, $$x^* Ixx + y^* Ixy = r^* \cos(\beta) - z^* Ixz \quad (7)$$

For ease of manipulation, let, $$r^* \cos(\beta) - z^* Ixz = q_2 \quad (8)$$

Then, from (6), $$x^* Ixx + y^* Ixy = q_2 \quad (9)$$

We also have, $$x^2 + y^2 + z^2 = r^2 \quad (10)$$

or, $$x^2 + y^2 = r^2 - z^2 \quad (11)$$

Equations 9 and 11 provide two equations in which the two unknowns x and y and can be solved for both. They can be solved in any order.

Let, $$Ixy^* Ixy = q_3 \quad (12)$$

Then from (9) and (11), we have the quadratic in x, $$ax^2 + bx + c = 0 \quad (13)$$

with, $$a = 1 + Ixx^2/q_3$$

$$b = -2^* q_2^* Ixx/q_3$$

$$c = q_2^2/q_3 + z^2 - r^2 \quad (14)$$

After solving for x, y is computed using (9):

$$y = (q_2 - x^* Ixx)/Ixy \quad (15)$$

With a terrain elevation database available, one can proceed to incorporate the terrain information in the target location process in the iterative manner illustrated in FIG. 9.

For any assumed target elevation, $h_{target-i} = h_i$, we can compute a target position $(x_i, y_i, z_i)$ in the platform ENU system, which, after the necessary transformations, can be expressed as a target position $(x_i, y_i, z_i)_{ECF}$ in the ECF system.

On a spherical planet, one can easily compute the latitude and longitude of the target as:

$$\phi_i = \sin^{-1}\left(\frac{z_i}{\sqrt{(x_i^2 + y_i^2 + z_i^2)}}\right) \quad (16)$$

and $$\lambda_i = \tan^{-1}\left(\frac{y_i}{x_i}\right) \quad (17)$$

One can now search the terrain elevation database for the terrain elevation at the computed target location ($\phi_i$, $\lambda_i$) to find the target elevation $h_{database-i}$.

If $$h_{target-i} = h_{database-i}$$

the final solution has been reached. Else, we repeat the iteration with $$h_{target-i+i} = h_{database-i}$$

A desktop simulation was used to simulate a MEO constellation attempting to locate moving targets within an area of interest (AOI) in North Korea. FIG. 10 shows the standard deviation of the position errors on the ground plane from 1000 Monte Carlo runs for a single target when no DTED information is available. FIG. 11 shows the results with the iterative technique and DTED data. The substantial improvement in 2D location accuracy is evident when the results from FIG. 11 are compared to the results of FIG. 10.

Exemplary Computer System

FIG. 12 illustrates an example computer system 1200, in which the present invention can be implemented as computer-readable code. Various embodiments of the invention are described in terms of this example computer system 1200. After reading this description, it will become apparent to a person skilled in the relevant art how to implement the invention using other computer systems and/or computer architectures.

FIG. 12 illustrates one or more processors, such as processor 1204. Processor 1204 can be a special purpose or a general purpose digital signal processor. The processor 1204 is connected to a communications infrastructure 1206 (for example, a bus or network). Various software implementations are described in terms of this exemplary computer system. After reading this description, it will become apparent to a person skilled in the relevant art how to implement the invention using other computer systems and/or computer architectures.

Computer system 1200 also includes a main memory 1208, preferably random access memory (RAM), and may also include a secondary memory 1210. The secondary memory 1210 may include, for example, a hard disk drive 1212 and/or a removable storage drive 1214, representing a floppy disk drive, a magnetic tape drive, an optical disk drive, etc. The removable storage drive 1214 reads from and/or writes to a removable storage unit 1218 in a well known manner. Removable storage unit 1218, represents a floppy disk, magnetic tape, optical disk, etc. which is read by and written to by removable storage drive 1214. As will be appreciated, the removable storage unit 1218 includes a computer usable storage medium having stored therein computer software and/or data.

In alternative implementations, secondary memory 1210 may include other similar means for allowing computer programs or other instructions to be loaded into computer system 1200. Such means may include, for example, a removable storage unit 1222 and an interface 1220. Examples of such means may include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

Computer system 1200 may also include a communications interface 1224. Communications interface 1224 allows software and data to be transferred between computer system 1200 and external devices. Examples of communications interface 1224 may include a modem, a network interface (such as an Ethernet card), a communications port, a PCMCIA slot and card, wired or wireless systems, etc. Software and data transferred via communications interface 1224 are in the form of signals 1228 which may be electronic, electromagnetic, optical or other signals capable of being received by communications interface 1224. These signals 1228 are provided to communications interface 1224 via a communications path 1226. Communications path 1226 carries signals 1228 and may be implemented using wire or cable, fiber optics, a phone line, a cellular phone link, an RF link and other communications channels.

In this document, the terms "computer program medium" and "computer usable medium" are used to generally refer to media such as removable storage drive 1214, a hard disk installed in hard disk drive 1212, and signals 1228. These computer program products are means for providing software to computer system 1200.

Computer programs (also called computer control logic) are stored in main memory 1208 and/or secondary memory 1210. Computer programs may also be received via communications interface 1224. Such computer programs, when executed, enable the computer system 1200 to implement the present invention as discussed herein. In particular, the computer programs, when executed, enable the processor 1204 to implement the processes of the present invention, such as the method(s) implemented as described above. These processes may be performed automatically, of invoice some form of manual intervention. Accordingly, such computer programs represent controllers of the computer system 1200. Where the invention is implemented using software, the software may be stored in a computer program product and loaded into computer system 1200 using removable storage drive 1214, hard drive 1212 or communications interface 1224.

The invention is also directed to computer products (also called computer program products) comprising software stored on any computer useable medium. Such software, when executed in one or more data processing device, causes the data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.). It is to be appreciated that the embodiments described herein can be implemented using software, hardware, firmware, or combinations thereof.

Exemplary Operation

FIG. 13 is a flow chart depicting an operation 1300, according to an embodiment of the present invention. In step 1302, an estimated target position value in a first coordinate system is determined for a target having a longitudinal plane that is oriented at an angle to a ground plane of a planet and elevated from the ground plane of the planet. In step 1304, the estimated target position value is converted into a second coordinate system of an airborne measuring device. In step 1306, a topographical map of a surface of the planet proximate the target is determined. In step 1308, an actual target position value based the converted estimated target position value and the topographical map is iteratively calculated.

Although the embodiments and systems above are discussed as being able to measure a target which is not on the ground, i.e., in a mountain or the like, it is to be appreciated that in other example ground based or water based targets can also be measured using the above described systems and/or methods. Also, targets visible from the measuring device, but below a ground surface, i.e., in a crater or the like, can also be measuring using the above systems and/or methods.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A system for measuring the position of a target, comprising:
   a surface determining device that determines a topographical map of the surface of the planet proximate the target and stores the topographical map in a storage device;
   an airborne measuring device that transmits a signal toward the target and that receives a return signal from the target based on the transmitted signal; and
   a processing device, coupled to the airborne measuring device, which determines a position of the target based on the received signal and the topographical map stored in the storage device.

2. The system of claim 1, wherein the surface determining device determines the surface topographical map based on stored data in the storage device.

3. The system of claim 1, wherein the surface determining device determines the surface topographical map based on measuring the actual surface and calculating a topographical map, which is stored in the storage device.

4. The system of claim 1, wherein the airborne measuring device comprises a platform, an antenna or a radar.

5. The system of claim 1, wherein the airborne measuring device is located outside an atmosphere of the planet.

6. The system of claim 1, wherein:
   the target position is reported in a latitude-longitude-height coordinate system; and
   the airborne measuring device is reported in a earth centered, fixed coordinates, with standard definition coordinate system, which is a right-handed centered coordinate system with its origin at a center of the airborne measuring device having a x-axis along a long dimension, a z axis normal to a face, and a y-axis along a short dimension of the airborne measuring device.

7. The system of claim 6, wherein an orientation of the airborne measuring device is reported in roll angle coordinate system about the x-axis, pitch angle about the y-axis, and yaw angle about the Z-axis.

8. The system of claim 1, wherein the processing device calculates target altitude through:
   receiving information related to a target altitude from the surface determining device;
   converting the received information into an airborne measuring device face coordinate system to determine a target range vector, a target azimuth angle value, and a target elevation angle value with respect to the airborne measuring device;
   determining whether the target altitude is above or below a ground plane level; and
   iteratively changing the target elevation value until the target altitude is at the ground plane level.

9. The system of claim 1, wherein:
   the airborne measuring device measures a distance from the device to the target and a cone angle made by a range vector in a longitudinal axis of the airborne measuring device;
   the processing device transforms the distance and cone angle into x, y, and z coordinates in an east-north-up coordinate system; and
   the processing device uses the x, y, and z coordinates and an estimated target altitude value based on the topographical map information to iteratively determine an actual target altitude.

10. A method for determining the position of a target, comprising:
   (a) determining an estimated target position value in a first coordinate system for the target;
   (b) converting the estimated target position value into a second coordinate system of an airborne measuring device;
   (c) determining a topographical map of an surface of the planet proximate the target; and
   (d) iteratively calculating an actual target position value based on the converted estimated target position value and the topographical map.

11. The method of claim 10, wherein:
   step (a) comprises using a latitude-longitude-height coordinate system as the first coordinate system; and
   step (b) comprises using a east-north-up coordinate system as the second coordinate system.

12. The method of claim 10, wherein:
   step (b) comprises converting the estimated target position into an airborne measuring device face coordinate system to determine a target a range vector, a target azimuth value, and a target elevation value with respect to the airborne measuring device
   step (d) comprises:
      (d1) using an estimated target altitude from the topographical map and the target range vector, target azimuth, and target elevation values to determine whether the estimated target altitude is above or below a ground plane level, and (d2) iteratively changing the target elevation value until the target altitude is at the ground plane level.

13. The method of claim 10, wherein:

step (a) comprises measuring a distance from an airborne measuring device to the target and a cone angle made by a range vector in a longitudinal axis of the airborne measuring device;

step (b) comprises transforming the distance and cone angle into x, y, and z coordinates in an east-north-up coordinate system; and step (d) comprises using the x, y, and z coordinates and the estimated target position based on the topographical map information to iteratively determine the actual target position.

14. A computer program product for determining the position of a target comprising a computer useable medium having a computer program logic recorded thereon for controlling at least one processor, the computer program logic comprising:

computer program code means for determining an estimated target position value in a first coordinate system for the target;

computer program code means for converting the estimated target position value into a second coordinate system of an airborne measuring device;

computer program code means for determining a topographical map of a surface of the planet proximate the target; and computer program code means for iteratively calculating an actual target position value based on the converted estimated target position value and the topographical map.

15. The computer program product of claim 14, wherein:

the computer program code means for determining uses a latitude-longitude-height coordinate system as the first coordinate system; and the computer program code means for converting uses a east-north-up coordinate system as the second coordinate system.

16. The computer program product of claim 14, wherein:

the computer program code means for converting converts the estimated target position into an airborne measuring device face coordinate system to determine a target range vector, a target azimuth value, and a target elevation value with respect to the airborne measuring device the computer program code means for iteratively calculating, uses an estimated target altitude from the topographical map and the target range vector, target azimuth, and target elevation values to determine whether the estimated target altitude is above or below a ground plane level, and iteratively changes the target elevation value until the target altitude is at the ground plane level.

17. The computer program product of claim 14, wherein:

the computer program code means for determining measures a distance from an airborne measuring device to the target and a cone angle made by a range vector in a longitudinal axis of the airborne measuring device;

the computer program code means for converting transforms the distance and cone angle into x, y, and z coordinates in an east-north-up coordinate system; and the computer program code means for iteratively calculating uses the x, y, and z coordinates and the estimated target position based on the topographical map information to iteratively determine the actual target position.

* * * * *